United States Patent [19]
Houlihan

[11] 3,910,947
[45] Oct. 7, 1975

[54] PREPARATION OF IMIDAZO[2,1-A]ISOINDOLES

[75] Inventor: William J. Houlihan, Mountain Lakes, N.J.

[73] Assignee: Sandoz, Inc., E. Hanover, N.J.

[22] Filed: Oct. 18, 1973

[21] Appl. No.: 407,434

Related U.S. Application Data

[60] Division of Ser. No. 844,636, July 24, 1969, abandoned, which is a division of Ser. No. 726,533, May 3, 1968, abandoned, which is a continuation-in-part of Ser. No. 660,609, Aug. 15, 1967, abandoned.

[52] U.S. Cl..... 260/309.6; 260/309.7; 260/326.5 L; 260/515 A; 260/591; 260/649 F; 424/273
[51] Int. Cl.² ........................................ C07D 49/34
[58] Field of Search .................................. 260/309.6

[56] References Cited
UNITED STATES PATENTS 3,555,042  1/1971  Sulkowski ...................... 260/309.7
3,803,155  4/1971  Sulkowski et al. ............ 260/294.8 R
3,864,360  2/1975  Sulkowski ...................... 260/309.6 X
3,867,401  2/1975  Sulkowski ...................... 260/309.6 X

FOREIGN PATENTS OR APPLICATIONS 712,958  9/1968  Belgium ............................ 260/309.6

*Primary Examiner*—Ethel G. Love
*Attorney, Agent, or Firm*—Gerald D. Sharkin; Robert S. Honor

[57] ABSTRACT

Compounds of the class of 5-hydroxy-5-aryl-2,3-dihydro-5H-imidazo[2,1-a]isoindoles and which are useful as psychic energizers and anorectics are prepared by reduction of a 2-(β-aminoethyl) phthalimidine followed by air oxidation of the resulting isoindole intermediate.

4 Claims, No Drawings

PREPARATION OF IMIDAZO[2,1-A]ISOINDOLES

This application is a division of application Ser. No. 844,636, filed July 24, 1969, now abandoned, which in turn is a division of application Ser. No. 726,533, filed May 3, 1968, now abandoned, which in turn was a continuation-in-part of application Ser. No. 660,609, filed Aug. 15, 1967, pending at the time of the filing of Ser. No. 726,533, and now abandoned.

This invention relates to the preparation of tricyclic compounds. In particular, the invention pertains to a process for preparing 5-hydroxy-5-aryl-2,3-dihydro-5H-imidazo[2,1-a] isoindoles and to novel intermediates utilized in said process.

In accordance with the process of the present invention isoindoles of the formula

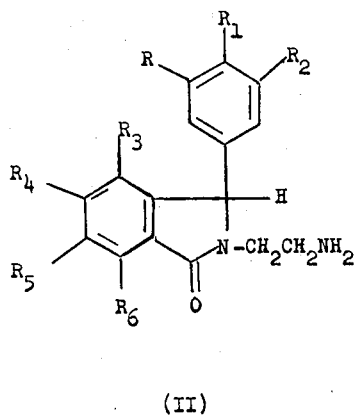

(I)

wherein each of R, $R_1$ and $R_2$ is, independently, hydrogen, chloro, fluoro, straight-chain(lower)alkyl (preferably containing from 1 to 4 carbon atoms, i.e. methyl, ethyl, propyl or butyl), straight-chain(lower) alkoxy (preferably containing from 1 to 4 carbon atoms, i.e. methoxy, ethoxy, propoxy and butoxy), or trifluoromethyl; provided that 1. R, $R_1$ and $R_2$ are such that there is never a trifluoromethyl radical on each of two adjacent carbon atoms, and 2. When R or $R_2$ is trifluoromethyl, $R_1$ is hydrogen, chloro or fluoro;

each of $R_3$, $R_4$ and $R_5$ is, independently, hydrogen, chloro, or fluoro, and $R_6$ is hydrogen or fluoro;

provided further that not more than two of $R_3$, $R_4$, $R_5$ and $R_6$ are other than hydrogen, and that not more than three of R, $R_1$, $R_2$, $R_3$, $R_4$, $R_5$ and $R_6$ are other than hydrogen, are prepared by reducing an appropriately substituted 2-($\beta$-aminoethyl) phthalimidine with lithium aluminum hydride to form the corresponding 5-aryl-2,3-dihydro-5H-imidazo[2,1-a] isoindole and then exposing the latter to air. This process is illustrated by the following reaction scheme:

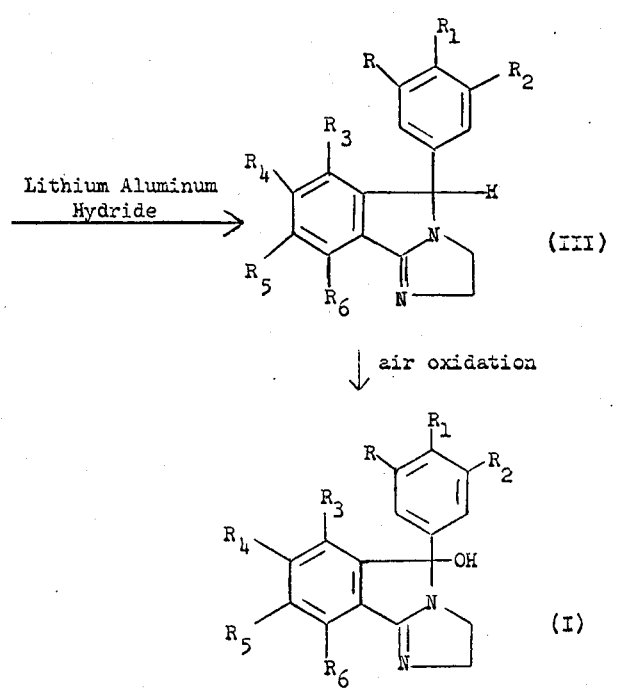

wherein R, $R_1$, $R_2$, $R_3$, $R_4$, $R_5$ and $R_6$ are as previously defined.

The reduction with lithium aluminum hydride is carried out in an inert ether solvent, e.g., tetrahydrofuran, diethyl ether and n-dibutyl ether, under an inert atmosphere, e.g., helium, nitrogen and argon, and at an elevated temperature of from about 45° to about 85°C. Preferably, the reduction is carried out at the reflux temperature of the system and under a nitrogen atmosphere. The reduction is generally complete in from 6 to 96 hours.

Conversion of the 5-aryl-2,3-dihydro-5H-imidazo[2,1-a] isoindole (III) to the desired 5-hydroxy derivative (I) can be accomplished by allowing the isoindole intermediate (III) to come in contact with air, e.g., by standing at room temperature in an open vessel for from 2 to 10 days. However, it is more desirable to accelerate the conversion, and this can be readily accomplished by bubbling air or oxygen into a solution of the isoindole in an inert organic solvent, preferably methanol or ethanol. In this manner, appreciable yields of the desired product are obtained within about 4 hours.

The phthalimidines (II) employed as starting materials are readily prepared by catalytically reducing a 9b-phenyl-1,2,3,9b-tetrahydro-5H-imidazo[2,1-a]isoindol-5-one as illustrated by the following reaction scheme:

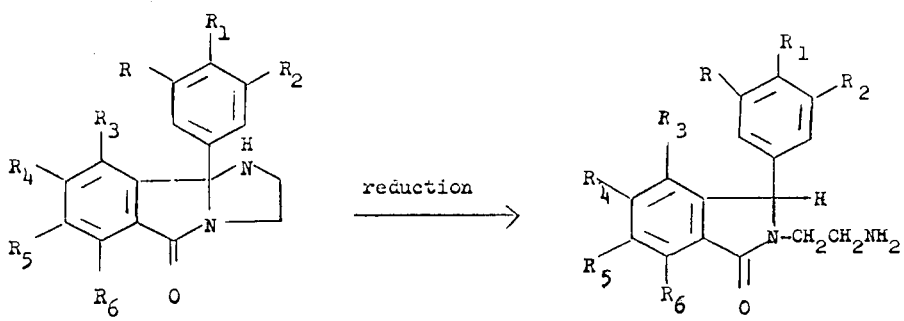

(IV)     (II)

wherein R, $R_1$, $R_2$, $R_3$, $R_4$, $R_5$, and $R_6$ are as previously defined.

Catalytic reduction is most readily effected in an inert organic solvent, desirably a lower aliphatic acid, preferably acetic acid, and in the presence of a platinum catalyst, e.g., platinum, platinum-carbon, platinum-alumina, platinum-asbestos and platinum dioxide.

The reduction may be carried out at room temperature (20°–25°C.) or at elevated temperatures of up to about 75°C. Preferably, the temperature is in the range of from about 20° to about 30°C. and the hydrogen pressure is in the range of from about 15 to about 100 p.s.i.

Various of the isoindolones (IV) and their preparation have been described in the literature (see, e.g., Netherlands Patent No. 6,501,647, published Aug. 12, 1965). Such others which are not specifically described in the literature may be prepared in analogous manner by reacting an appropriate benzoylbenzoic acid with ethylenediamine.

The compounds of formula (I) are useful because they possess pharmacological activity in animals. In particular, the compounds possess appetite depressant activity as indicated by their activity in rat given 12.5–50 mg/kg of active agent and tested by use of the free-feeding method described by Randall, et al. (J.P.E.T., 129, 163, 1960) whereby 16 groups of six male Wistar rats are deprived of food for 18 hours but receive water ad libitum. Consumption of ground food is then measured over a 4 hour period following oral administration of the agent tested. Accordingly, such compounds may be used as anorexigenic agents. The compounds of formula (I) also possess central nervous system stimulant activity and can be used as psychic energizers as indicated by their activity in mouse given 12.5–25 mg/kg of active compound and tested by use of a 30 word adjective check sheet method basically as described by Irwin, S. (Gordon Research Conference, Medicinal Chemistry, 1959), and Chen (Symposium on Sedative and Hypnotic Drugs, Williams and Wilkins, 1954).

For such uses, the compounds may be combined with a pharmaceutically acceptable carrier, and such other adjuvants as may be necessary, and administered orally in such forms as tablets, capsules, elixirs, suspensions and the like or parenterally in the form of an injectable solution or suspension. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention.

Representative of such salts are the mineral acid salts such as the hydrobromide, hydrochloride, sulfate, phosphate and the like and the organic acid salts such as the succinate, benzoate, acetate, maleate, p-toluene-sulfonate, benzenesulfonate and the like.

For the above-mentioned uses, the dosage administered will, of course, vary depending upon the compound employed, the mode of administration and treatment desired. However, in general, satisfactory results are obtained for each of the above-mentioned uses when the active compounds are administered at a daily dosage of from about 0.1 milligrams to about 50 milligrams per kilogram of animal body weight, preferably given in divided doses, 2 to 4 times a day, or in sustained release form. For most mammals the daily dosage is generally in the range of from about 1 milligram to about 75 milligrams, and dosage forms suitable for internal administration comprise from about 0.25 milligrams to about 37.5 milligrams of the compound admixed with a solid or liquid pharmaceutical carrier or diluent.

Representative formulations are tablets (prepared by standard tabletting techniques) and containing the following ingredients:

| Ingredient | Quantity (mg) | |
|---|---|---|
| 5-(p-chlorophenyl)-5-hydroxy-2,3-dihydro-5H-imidazo[2,1-a]isoindole | 1 | 25 |
| polyvinylpyrrolidone | 3.5 | 6 |
| lactose | 40 | 90 |
| calcium sulfate | 16.5 | 68 |
| corn starch | 8 | 18 |
| talc | 5 | 10 |
| magnesium stearate | 1.0 | 3 |
| | 75 mg | 220 mg |

The following examples show representative compounds which are prepared in accordance with the process of this invention. However, it is to be understood that the examples are for purposes of illustration only and are not intended as in any way limiting the scope of the invention which is defined in the appended claims.

EXAMPLE 1

5-Hydroxy-5-(p-chlorophenyl)-2,3-dihydro-5H-imidazo[2,1-a]isoindole

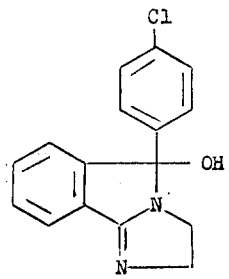

To a flask equipped with a stirrer, reflux condenser, addition funnel and gas inlet tube is added 100 ml. of absolute tetrahydrofuran and 1.3 g. (0.034 mole) of lithium aluminum hydride. The system is blanketed with nitrogen and then a solution of 5.0 g. (0.017 mole) of 2-(β-aminoethyl)-3-(p-chlorophenyl)phthalimidine in 50 ml. of absolute tetrahydrofuran is added dropwise with stirring. The resulting mixture is refluxed for 72 hours and then cooled in an ice bath. To the cooled mixture is added dropwise 2.6 ml. of 2N sodium hydroxide and 3.9 ml. of water. The resulting mixture is stirred for 15 minutes and then 25 g. of anhydrous sodium sulfate is added. The mixture thus obtained is filtered and the filtrate evaporated in vacuo on a rotary evaporator to obtain crude 5-(p-chlorophenyl)-2,3-dihydro-5H-imidazo[2,1-a]isoindole. The crude intermediate product is then crystallized out of 50 ml. of a mixture of methanol-tetrahydrofuran (1:1). After standing 2 weeks at room temperature there is obtained 5-hydroxy-5-(p-chlorophenyl)-2,3-dihydro-5H-imidazo[2,1-a]isoindole, m.p. 198°–201°C.

EXAMPLE 2

5-Hydroxy-5-(p-chlorophenyl)-2,3-dihydro-5H-imidazo[2,1-a]isoindole

To a flask equipped with a stirrer, reflux condenser, addition funnel and gas inlet tube is added 100 ml. of absolute tetrahydrofuran and 1.3 g. (0.034 mole) of lithium aluminum hydride. The system is blanketed with nitrogen and then a solution of 5.0 g. (0.017 mole) of 2-(β-aminoethyl)-3-(p-chlorophenyl)phthalimidine in 50 ml. of absolute tetrahydrofuran is added dropwise with stirring. The resulting mixture is refluxed for 72 hours and then cooled in an ice bath. To the cooled mixture is added dropwise 2.6 ml. of 2N sodium hydroxide and 3.9 ml. of water. The resulting mixture is stirred for 15 minutes and then 25 g. of anhydrous sodium sulfate is added. The mixture thus obtained is filtered and the filtrate evaporated in vacuo on a rotary evaporator to obtain crude 5-(p-chlorophenyl)-2,3-dihydro-5H-imidazo[2,1-a]isoindole. The crude intermediate product is dissolved in 50 ml. of methanol and the resulting solution treated for 12 hours with a stream of air. The resulting solid product is filtered off and the filtrate evaporated in vacuo to obtain additional product. The combined products are crystallized from 50 ml. of methanol-tetrahydrofuran (1:1) to obtain 5-hydroxy-5-(p-chlorophenyl)-2,3-dihydro-5H-imidazo[2,1-a]isoindole, m.p. 198°–201°C.

EXAMPLE 3

Following the procedure of Example 1 and employing an equivalent amount of the phthalimidines enumerated below in place of the 2-(β-aminoethyl)-3-(p-chlorophenyl)phthalimidine used therein, there are obtained the isoindoles set forth below:

| Phthalimidine | Isoindole Intermediate | Final Product |
|---|---|---|
| 2-(β-aminoethyl)-3-phenylphthalimidine | 5-phenyl-2,3-dihydro-5H-imidazo[2,1-a]isoindole | 5-hydroxy-5-phenyl-2,3-dihydro-5H-imidazo[2,1-a]isoindole, m.p. 197°–199°C. |
| 2-(β-aminoethyl)-3-(p-fluorophenyl)phthalimidine | 5-(p-fluorophenyl)-2,3-dihydro-5H-imidazo[2,1-a]isoindole | 5-hydroxy-5-(p-fluorophenyl)2,3-dihydro-5H-imidazo[2,1-a]isoindole, m.p. 198°–199°C. |
| 2-(β-aminoethyl)-3-(p-methoxyphenyl)phthalimidine | 5-(p-methoxyphenyl)-2,3-dihydro-5H-imidazo[2,1-a]isoindole | 5-hydroxy-5-(p-methoxyphenyl)-2,3-dihydro-5H-imidazo[2,1-a]isoindole, m.p. 188°–190°C. |
| 2-(β-aminoethyl)-3-(3,4-dichlorophenyl)phthalimidine | 5-(3,4-dichlorophenyl)-2,3-dihydro-5H-imidazo[2,1-a]isoindole | 5-hydroxy-5-(3,4-dichlorophenyl)-2,3-dihydro-5H-imidazo[2,1-a]isoindole, m.p. 200°–201°C. |

EXAMPLE 4

Following the procedure of Example 2 and employing an equivalent amount of the phthalimidines enumerated below in place of the 2-(β-aminoethyl)-3-(p-chlorophenyl)phthalimidine used therein, there are obtained the isoindoles set forth below:

| Phthalimidine | Isoindole Intermediate | Final Product |
|---|---|---|
| 2-(β-aminoethyl)3-(m-chlorophenyl)phthalimidine | 5-(m-chlorophenyl)-2,3-dihydro-5H-imidazo[2,1-a]isoindole | 5-hydroxy-5-(m-chlorophenyl)-2,3-dihydro-5H-imidazo[2,1-a]isoindole, m.p. 208°–210°C. |
| 2-(β-aminoethyl)-3-(p-trifluoromethylphenyl)phthalimidine | 5-(p-trifluoromethylphenyl)-2,3-dihydro-5H-imidazo[2,1-a]isoindole | 5-hydroxy-5-(p-trifluoromethylphenyl)-2,3-dihydro-5H-imidazo[2,1-a]isoindole, m.p. 210°–212°C. |
| 2-(β-aminoethyl)-3-(p-tolyl)phthalimidine | 5-(p-tolyl)-2,3-dihydro-5H-imidazo[2,1-a]isoindole | 5-hydroxy-5-(p-tolyl)-2,3-dihydro-5H-imidazo[2,1-a]isoindole, m.p. 203°–206°C. |
| 2-(β-aminoethyl)-3-(p-ethylphenyl)-phthalimidine | 5-(p-ethylphenyl)-2,3-dihydro-5H-imidazo[2,1-a]isoindole | 5-hydroxy-5-(p-ethylphenyl)-2,3-dihydro-5H-imidazo[2,1-a]isoindole, m.p. 177°–179°C. |
| 2-(β-aminoethyl)-4-chloro-3-phenyl phthalimidine | 6-chloro-5-phenyl-2,3-dihydro-5H-imidazo[2,1-a]isoindole | 6-chloro-5-hydroxy-5-phenyl-2,3-dihydro-5H-imidazo[2,1-a]isoindole, m.p. 224°–226°C. |
| 2-(β-aminoethyl)-3-(m-trifluoromethylphenyl)phthalimidine | 5-(m-trifluoromethylphenyl)-2,3-dihydro-5H-imidazo[2,1-a]isoindole | 5-hydroxy-5-(m-trifluoromethylphenyl)-2,3-dihydro-5H-imidazo[2,1-a]isoindole m.p. 209°–212°C. |

―Continued

| Phthalimidine | Isoindole Intermediate | Final Product |
|---|---|---|
| 2-(β-aminoethyl)-3-(m-fluorophenyl)phthalimidine | 5-(m-fluorophenyl)-2,3-dihydro-5H-imidazo[2,1-a]isoindole | 5-(m-fluorophenyl)-5-hydroxy-2,3-dihydro-5H-imidazo[2,1-a]isoindole, m.p. 200°–203°C. |
| 2-(β-aminoethyl)-3-(3,5-dichlorophenyl)phthalimidine | 5-(3,5-dichlorophenyl)-2,3-dihydro-5H-imidazo[2,1-a]isoindole | 5-(3,5-dichlorophenyl)-5-hydroxy-2,3-dihydro-5H-imidazo[2,1-a]isoindole, m.p. 207°–209°C. |
| 2-(β-aminoethyl) 5,6-dichloro-3-phenyl phthalimidine | 7,8-dichloro-5-phenyl-2,3-dihydro-5H-imidazo[2,1-a]isoindole | 7,8-dichloro-5-hydroxy-5-phenyl-2,3-dihydro-5H-imidazo[2,1-a]isoindole, m.p. 195°–198°C. |
| 2-(β-aminoethyl)-3-(p-chlorophenyl)-5,6-dichlorophthalimidine | 5-(p-chlorophenyl)-7,8-dichloro-5-hydroxy-2,3-dihydro-5H-imidazo[2,1-a]isoindole | 5-(p-chlorophenyl)-7,8-dichloro-5-hydroxy-2,3-dihydro-5H-imidazo[2,1-a]isoindole, m.p. 185°–190°C. |
| 2-(βaminoethyl)-6-chloro-3-phenyl phthalimidine | 8-chloro-5-phenyl-2,3-dihydro-5H-imidazo[2,1-a]isoindole | 8-chloro-5-hydroxy-5-phenyl-2,3-dihydro-5H-imidazo[2,1-a]isoindole, m.p. 210°–215°C. |
| 2-(β-aminoethyl)-5-chloro-3-phenyl phthalimidine | 7-chloro-5-phenyl-2,3-dihydro-5H-imidazo[2,1-a]isoindole | 7-chloro-5-hydroxy-5-phenyl-2,3-dihydro-5H-imidazol[2,1-a]isoindole, m.p. 197°–202°C. |
| 2-(β-aminoethyl)-5-fluoro-3-phenyl phthalimidine | 7-fluoro-5-phenyl-2,3-dihydro-5H-imidazo[2,1-a]isoindole | 7-fluoro-5-hydroxy-5-phenyl-2,3-dihydro-5H-imidazo[2,1-a]isoindole, m.p. 206°–208°C. |

EXAMPLE 5

To a flask equipped with a stirrer, dropping funnel and condenser are added 41.4 g. (0.60 mole) of sodium nitrite and 480 ml. of sulfuric acid. The contents are warmed at 70° for about 0.5 hours, cooled in an ice bath to an internal temperature of <30°C and then a solution of 85 g. (0.60 mole) of 2-methyl-4-chloroaniline in 25.0 ml. of acetic acid is added. The resultant mixture is filtered and added slowly to a solution of 100 g. (0.60 moles) of potassium iodide and 250 ml. of water at room temperature. The reaction mixture is stirred until $N_2$ evolution ceases. Sufficient solid sodium bisulfite to remove the free iodine is then added. The resultant oil is extracted with benzene, washed with 250 ml. of 10% sodium hydroxide, dried with magnesium sulfate, filtered and distilled to give 2-iodo-5-chlorotoluene. b.p. 88°–90°C. at 0.35 mm. Hg. $n\ D^{2°}$ 1.6180.

When the above process is carried out and the following starting material is used in place of 2-methyl-4-chloroaniline, the indicated product is obtained.

| Starting Material | Product |
|---|---|
| a) 2-methyl-5-chloroaniline | 2-iodo-4-chlorotoluene b.p. 66°–68°C (0.2 mm) $n_D^{2°}$ 1.6220 |
| b) 2-methyl-5-fluoroaniline | 2-iodo-4-fluorotoluene b.p. 67°–68°C (0.5 mm) $n_D^{2°}$ 1.5805 |

EXAMPLE 6

To a flask equipped with stirrer, condenser, dropping funnel and thermometer is charged 30 ml. of 15% n-butyl lithium (0.05 mole) in hexane. The system is blanketed with nitrogen, cooled to an internal temperature of −20°C. A solution of 2-iodo-4-fluorotoluene (11.8 g., 0.05 mole) in 100 ml. anhydrous diethyl ether is then added dropwise. The reaction mixture is stirred an additional 10 minutes at −20° to −25°C and the reaction mixture is then poured onto a slurry of solid carbon dioxide (50 g.) and ether (150 ml.). After the mixture has come to room temperature it is extracted with 2 times 50 ml. 2N NaOH. The caustic layer is acidified with concentrated hydrochloric acid. The resultant solid is filtered off to obtain 5-fluoro-o-toluic acid, m.p. 128°–130°C.

When the above process is carried out and the following starting material is used in place of 2-iodo-4-fluorotoluene, the indicated product is obtained.

| Starting Material | Product |
|---|---|
| a) 2-iodo-5-chlorotoluene | 4-chloro-o-toluic acid, m.p. 169°–170°C. |
| b) 2-iodo-4-chlorotoluene | 5-chloro-o-toluic acid, m.p. 170°–172°C. |

EXAMPLE 7

To a flask equipped with stirrer, condenser, dropping funnel and gas exit tube is charged 91.5 g (0.69 mole) of anhydrous aluminum chloride and 250 ml. of 3,4-dichlorotoluene. A solution of 74 g (0.53 mole) of benzoyl chloride in 250 ml. 3,4-dichlorotoluene is stirred and added dropwise and the reaction mixture is slowly warmed until hydrogen chloride begins to evolve. After the HCl evolution is finished, the mixture is carefully poured into ca. 750 g ice and 500 ml. concentrated HCl. The organic layer is separated and the water layer is washed with benzene. The combined organic extracts are washed with water, sautrated NaCl solution and then dried with $MgSO_4$. Filter and distill to give 2-methyl-4,5-dichlorobenzophenone, b.p. 175°–180°C (0.75 mm).

When the above process is carried out and the following starting materials are used in place of 3,4-dichlorotoluene and benzoyl chloride, the indicated products are obtained.

| Starting Materials | Product |
|---|---|
| a) Benzene and 5-fluoro-o-toluyl chloride | 2-methyl-5-fluoro-benzophenone, b.p. 135°–140°C (0.5 mm) |
| b) 3,4-dichlorotoluene and p-chlorobenzoyl chloride | 2-methyl-4,4',5-trichlorobenzophenone, b.p. 180°–185°C (0.5 mm) |
| c) Benzene and 4-chloro-o-toluyl chloride | 2-methyl-4-chlorobenzophenone, b.p. 150°–155°C (0.5 mm) |
| d) Benzene and 5-chloro-o-toluyl chloride | 2-methyl-5-chlorobenzophenone, m.p. 42°–43°C |

EXAMPLE 8

To a flask equipped with thermometer, dropping funnel, stirrer and condenser is charged 25.0 g (0.094 mole) of 2-methyl-4,4',5-trichlorobenzophenone and 130 ml of acetic acid. The mixture is stirred and dropwise is added a solution of 25.4 g. (0.25 mole) of chromium trioxide, 58 ml. water, 95 ml. of acetic acid and 18 ml. of concentrated sulfuric acid. After addition is completed, the mixture is stirred and refluxed for 2 hours and then poured onto 1500 g. of an ice-water mixture. The reaction mixture is stirred for 3 hours and the solids filtered off. Crystallization from etherpentane give 2-(p-chlorobenzoyl)-4,5-dichlorobenzoic acid; m.p. 185°–188°C.

When the above process is carried out and the following benzophenone is used in place of 2-methyl-4,4',5-trichlorobenzophenone, the indicated benzoic acid product is obtained.

is added dropwise with stirring over a 1.0 hour period. The reaction mixture is stirred and refluxed for an additional 15 hours, cooled in an icebath, treated with 300 ml. of 2N hydrochloric acid and stirred one hour. 1N sodium bicarbonate is then added, the water layer is separated and the mixture acidified with 2N hydrochloric acid. The acid layer is extracted twice with 250 ml. of dichloromethane, dried with magnesium sulfate, filtered and the solvent is removed in vacuo. The residue is crystallized from benzene-hexane to obtain 2-(3'-trifluoro-methyl-benzoyl)benzoic acid, m.p. 164°–166°C.

When the above process is carried out and m-bromofluorobenzene or 1-bromo-3,5-dichlorobenzene is used in place of m-bromobenzotrifluoride, 2-(3'-fluoro benzoyl) benzoic acid or 2-(3,5-dichlorobenzoyl)benzoic acid is obtained; m.p. 180°–181°C.

| Starting Materials | Product |
|---|---|
| a) 2-methyl-5-chlorobenzophenone | 2-benzoyl-4-chloro benzoic acid, m.p. 175°–177°C. |
| b) 2-methyl-4-chlorobenzophenone | 2-benzoyl-5-chloro benzoic acid, m.p. 173°–175°C. |
| c) 2-methyl-4,5-dichlorobenzophenone | 2-benzoyl-4,5-dichloro benzoic acid, m.p. 206°–208°C. |
| d) 2-methyl-5-fluoro benzophenone | 2-benzoyl-4-fluoro benzoic acid, m.p. 112°–114°C. |

EXAMPLE 9

To a flask equipped with stirrer, condenser, dropping funnel and gas inlet tube is charged 500 ml. of anhydrous tetrahydrofuran and 13.4 g. (0.55 mole) of magnesium shavings. The system is blanketed with nitrogen and dropwise is introduced a solution of 112.5 g. (0.50 mole) m-bromobenzotrifluoride in 100 ml. anhydrous THF. After the Grignard reaction is initiated the addition is regulated so that gentle reflux takes place. After the magnesium has been consumed the Grignard solution is transferred under nitrogen to the dropping funnel attached to flask containing a stirrer condenser gas inlet tube, 81.5 g. (0.55 mole) phthalic anhydride and 1000 ml. of anhydrous toluene. The Grignard solution

EXAMPLE 10

To a flask equipped with a Dean-Stark tube is admixed 2(3'-trifluoro-methyl-benzoyl)benzoic acid (10 g.), 4 g. of ethylene diamine, 150 ml. xylene and 0.5 g. of p-toluene-sulfonic acid. The reaction mixture is stirred and refluxed until water fails to separate from the condensate. The solvent is removed in vacuo and the residue is crystallized from isopropanol to obtain 9b-(m-trifluoromethyl-phenyl)-1,2,3,9b-tetrahydro-5H-imidazo[2,1-a]isoindol-5-one; m.p. 135°–137°C.

When the above process is carried out and the following starting material is used in place of 2-(3'-trifluoromethyl benzoyl) benzoic acid, the indicated isoindol-5-one is obtained.

| Starting Material | Product |
|---|---|
| a) 2-(3,5-dichlorobenzoyl)benzoic acid | 9b-(3,5-dichlorophenyl)-1,2,3,9b-tetrahydro-5H-imidazo[2,1-a]isoindol-5-one, m.p. 204°–207°C. |
| b) 2-benzoyl-5-chloro-benzoic acid | 7-chloro-9b-phenyl-1,2,3,9b-tetrahydro-5H-imidazo[2,1-a]isoindol-5-one, m.p. 193°–194°C. |
| c) 2-(3'-fluorobenzoyl)benzoic acid | 9b-(m-fluorophenyl)-1,2,3,9b-tetrahydro-5H-imidazo[2,1-a]isoindol-5-one, m.p. 144°–145°C. |
| d) 2-benzoyl-4-chlorobenzoic acid | 8-chloro-9b-phenyl-1,2,3,9b-tetrahydro-5H-imidazo[2,1-a]isoindol-5-one, m.p. 173°–174°C. |
| e) 2-benzoyl-4,5-dichloro benzoic acid | 7,8-dichloro-9b-phenyl-1,2,3,9b-tetrahydro-5H-imidazo[2,1-a]isoindol-5-one, m.p. 185°–187°C. |

-Continued

| Starting Material | Product |
| --- | --- |
| f) 2(p-chlorobenzoyl)-4,5-dichloro benzoic acid | 7,8-dichloro-9b-(p-chlorophenyl) 1,2,3-9b-tetrahydro-5H-imidazo [2,1-a]isoindol-5-one, m.p. 218°–219°C. |
| g) 2-benzoyl-4-fluoro benzoic acid | 8-fluoro-9b-phenyl-1,2,3,9b-tetrahydro-5H-imidazo[2,1-a] isoindol-5-one, m.p. 152°–153°C. |

What is claimed is:
1. A process for preparing a compound of the formula

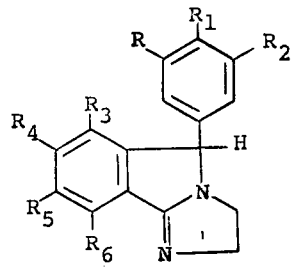

which comprises reducing a compound of the formula

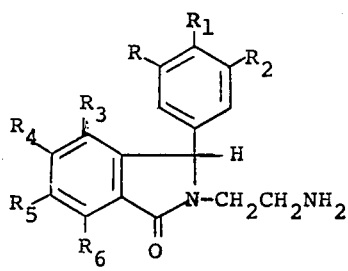

in an inert ether solvent and under an inert atmosphere with lithium aluminum hydride at a temperature of from about 45° to 85°C. for a period of time sufficient to form the desired product, wherein
each of R, $R_1$ and $R_2$ is, independently, hydrogen, chloro, fluoro, straight chain lower alkyl, straight chain lower alkoxy or trifluoromethyl; provided that
1. R, $R_1$ and $R_2$ are such that there is never a trifluoromethyl radical on each of two adjacent carbon atoms, and
2. when R or $R_2$ is trifluoromethyl, $R_1$ is hydrogen, chloro or fluoro;
each of $R_3$, $R_4$ and $R_5$ is independently, hydrogen, chloro of fluoro, and
$R_6$ is hydrogen or fluoro,
provided further that not more than two of $R_3$, $R_4$, $R_5$ and $R_6$ are other than hydrogen and that not more than three of R, $R_1$, $R_2$, $R_3$, $R_4$, $R_5$ and $R_6$ are other than hydrogen.

2. The process of claim 1 wherein the reduction is effected under a nitrogen atmosphere and at a temperature of from about 45° to 85°C.

3. A process for preparing 5-(p-chlorophenyl)-2,3-dihydro-5H-imidazo[2,1-a]isoindole which comprises reducing 2-(β-aminoethyl)-3-(p-chlorophenyl)phthalimidine in inert ether and under inert atmosphere with lithium aluminum hydride at a temperature of from about 45° to about 85°C. for a period of time sufficient to form the desired product.

4. A process for preparing
a. 5-phenyl-2,3-dihydro-5H-imidazo[2,1-a]isoindole,
b. 5-(p-fluorophenyl)-2,3-dihydro-5H-imidazo[2,1-a]isoindole,
c. 5-(p-methoxyphenyl)-2,3-dihydro-5H-imidazo[2,1-a]isoindole,
d. 5-(3,4-dichlorophenyl)-2,3-dihydro-5H-imidazo[2,1-a]isoindole,
e. 5-(m-chlorophenyl)-2,3-dihydro-5H-imidazo[2,1-a]isoindole,
f. 5-(p-trifluoromethylphenyl)-2,3-dihydro-5H-imidazo[2,1-a]isoindole,
g. 5-(p-tolyl)-2,3-dihydro-5H-imidazo[2,1-a]isoindole,
h. 5-(p-ethylphenyl)-2,3-dihydro-5H-imidazo[2,1-a]isoindole,
i. 6-chloro-5-phenyl-2,3-dihydro-5H-imidazo[2,1-a]isoindole,
j. 5-(m-trifluoromethylphenyl)-2,3-dihydro-5H-imidazo[2,1-a]isoindole,
k. 5-(m-fluorophenyl)-2,3-dihydro-5H-imidazo[2,1-a]isoindole,
l. 5-(3,5-dichlorophenyl)-2,3-dihydro-5H-imidazo[2,1-a]isoindole,
m. 7,8-dichloro-5-phenyl-2,3-dihydro-5H-imidazo[2,1-a]isoindole,
n. 5-(p-chlorophenyl)-7,8-dichloro-2,3-dihydro-5H-imidazo[2,1-a]isoindole,
o. 8-chloro-5-phenyl-2,3-dihydro-5H-imidazo[2,1-a]isoindole,
p. 7-chloro-5-phenyl-2,3-dihydro-5H-imidazo[2,1-a]isoindole, or
q. 7-fluoro-5-phenyl-2,3-dihydro-5H-imidazo[2,1-a]isoindole,
which comprises reducing
a. 2-(β-aminoethyl)-3-phenylphthalimidine,
b. 2-(β-aminoethyl)-3-(p-fluorophenyl)phthalimidine,
c. 2-(β-aminoethyl)-3-(p-methoxyphenyl)phthalimidine,
d. 2-(β-aminoethyl)-3-(3,4-dichlorophenyl)phthalimidine,
e. 2-(β-aminoethyl)-3-(m-chlorophenyl)phthalimidine,
f. 2-(β-aminoethyl)-3-(p-trifluoromethylphenyl)phthalimidine,
g. 2-(β-aminoethyl)-3-(p-tolyl)phthalimidine,
h. 2-(β-aminoethyl)-3-(p-ethylphenyl)phthalimidine,
i. 2-(β-aminoethyl)-4-chloro-3-phenyl phthalimidine,
j. 2-(β-aminoethyl)-3-(m-trifluoromethylphenyl)phthalimidine,
k. 2-(β-aminoethyl)-3-(m-fluorophenyl)phthalimidine, l. 2-(β-aminoethyl)-3-(3,5-dichlorophenyl)phthalimidine,
m. 2-(β-aminoethyl)-5,6-dichloro-3-phenyl phthalimidine,
n. 2-(β-aminoethyl)-3-(p-chlorophenyl)-5,6-dichlorophthalimidine,
o. 2-(β-aminoethyl)-6-chloro-3-phenyl phthalimidine,
p. 2-(β-aminoethyl)-5-chloro-3-phenyl phthalimidine, or
q. 2-(β-aminoethyl)-5-fluoro-3-phenyl phthalimidine, respectively, in inert ether and under inert atmosphere with lithium aluminum hydride at a temperature of from about 45° to about 85°C., for a period of time sufficient to form the desired corresponding product.

* * * * *